No. 831,426. PATENTED SEPT. 18, 1906.
J. GODDARD.
CAMERA.
APPLICATION FILED JULY 21, 1905.
2 SHEETS—SHEET 1.
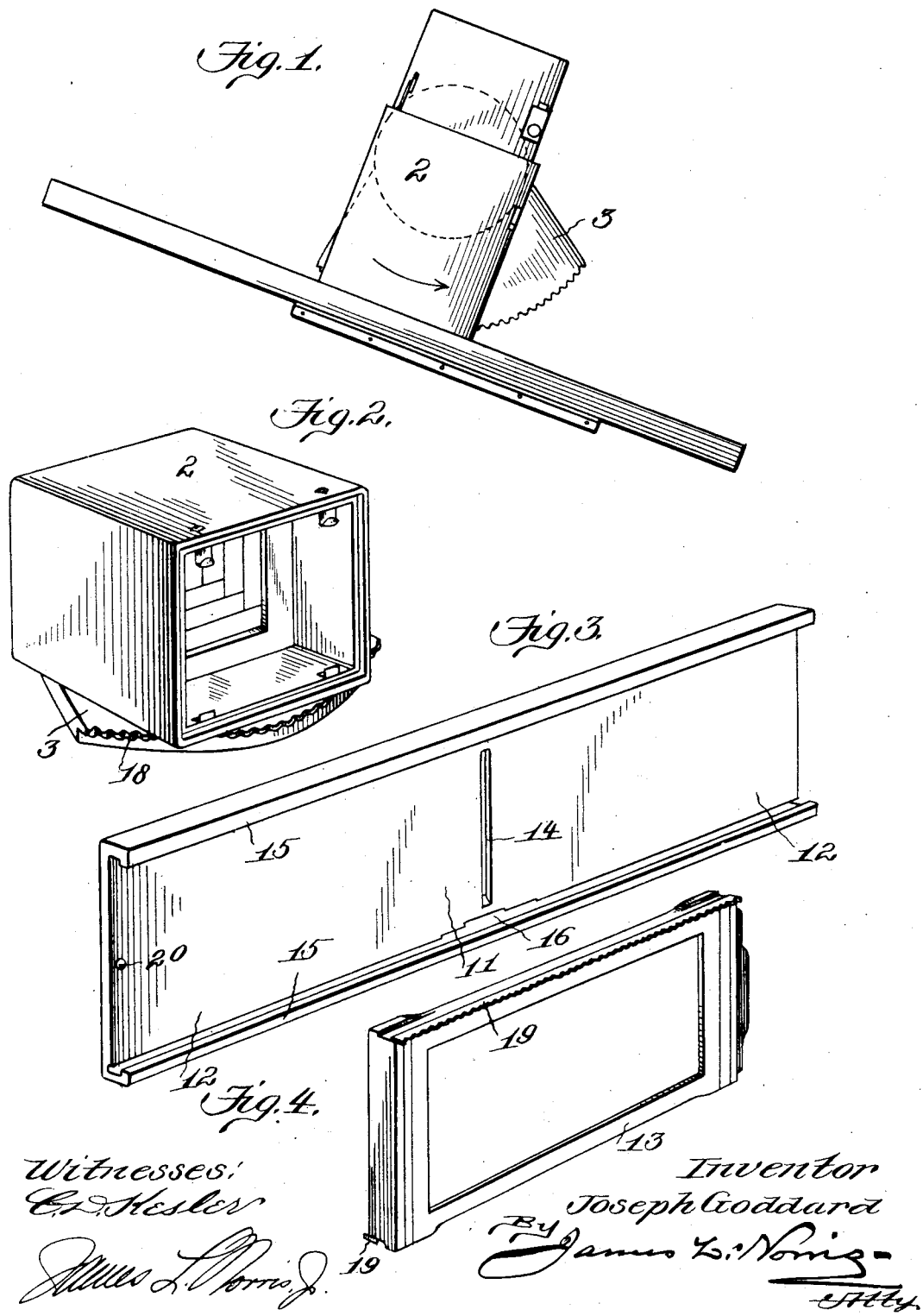

No. 831,426. PATENTED SEPT. 18, 1906.
J. GODDARD.
CAMERA.
APPLICATION FILED JULY 21, 1905.
2 SHEETS—SHEET 2.
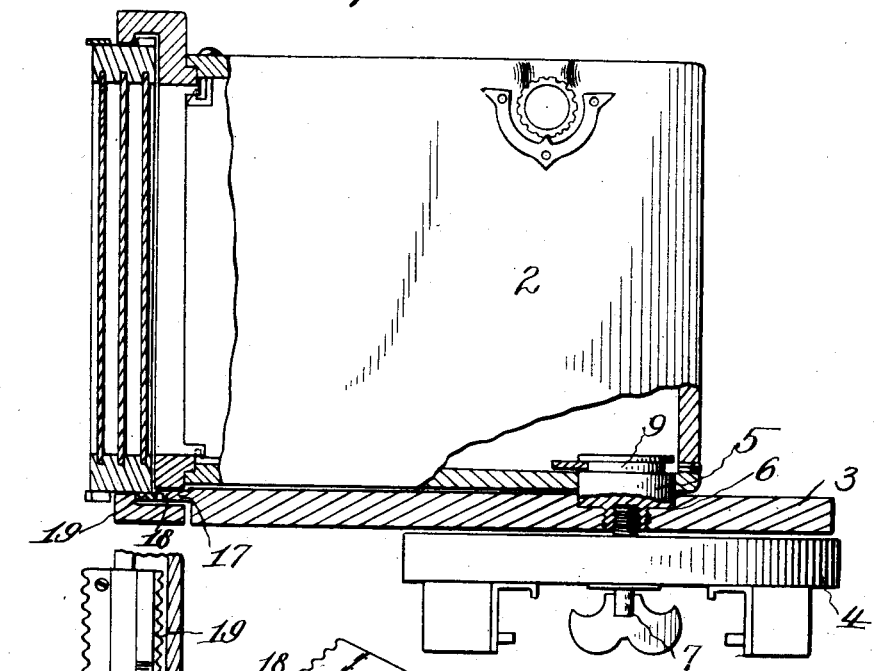
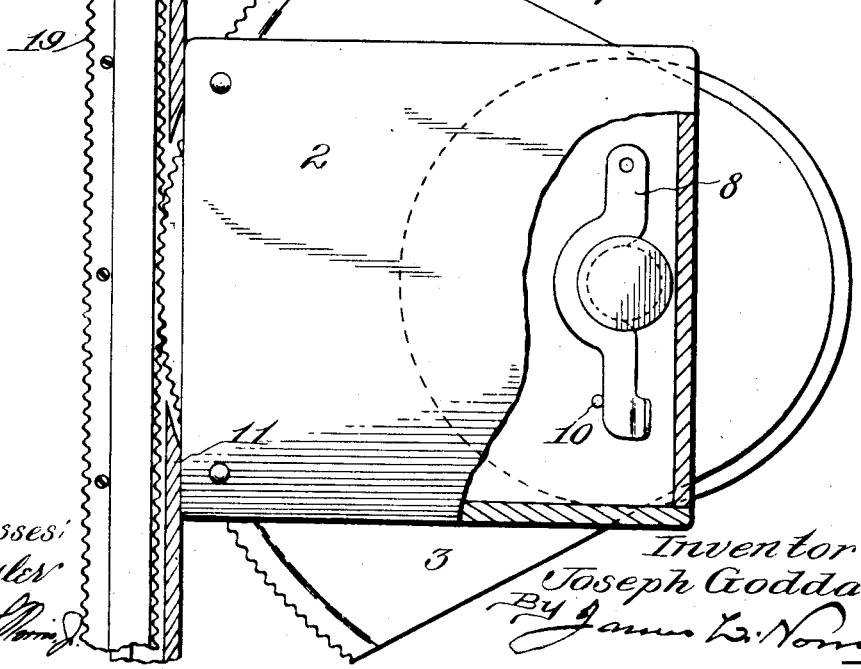
Witnesses
Inventor
Joseph Goddard

UNITED STATES PATENT OFFICE.

JOSEPH GODDARD, OF ROCHESTER, NEW YORK, ASSIGNOR TO SENECA CAMERA MANUFACTURING COMPANY, OF ROCHESTER, NEW YORK, A CORPORATION.

CAMERA.

No. 831,426.  Specification of Letters Patent.  Patented Sept. 18, 1906.

Application filed July 21, 1905. Serial No. 270,708.

*To all whom it may concern:*

Be it known that I, JOSEPH GODDARD, a citizen of the United States, residing at Rochester, in the county of Monroe and State of New York, have invented new and useful Improvements in Cameras, of which the following is a specification.

This invention relates to cameras, and more especially to that class known as "panoramic," the object of the invention being to provide a simple article of this character which is effective in action, easy to manipulate, and compact.

In the drawings accompanyng and forming a part of this specification I illustrate a form of embodiment of the invention which, to enable those skilled in the art to practice the same, I will set forth in detail in the following description, while what is novel will be included in the claims succeeding said description.

In the drawings, Figure 1 is a top plan view of a camera including my invention. Fig. 2 is a perspective view of the case thereof and its supporting-base. Fig. 3 is a similar view of the rear wall of the case with its laterally-widened portions. Fig. 4 is a like view of the plate-holder. Fig. 5 is a side elevation, partly in section, of the camera; and Fig. 6 is a top plan view, partly in section, of the same, said Figs. 5 and 6 being upon an enlarged scale.

Like characters refer to like parts throughout the different views

The camera illustrated involves in its construction a camera case or box, which may be of the usual construction and have the customary accessories, such as lens, &c. These accessories I need not describe.

Any suitable base may be provided for sustaining the camera-box. The base shown is denoted by 3, and it is of segment or fan shape. The base 3 in turn is carried upon a suitable support, which may be the usual tripod, the head of which is designated by 4. The camera case or box 2 is mounted to turn through any desired part of a circle upon the base 3. The movement of the camera-box will be regulated by the length of the panoramic picture to be obtained. The pivot for the camera-case is denoted by 5, and it rests upon the base and has a reduced pendent stem 6, fitted non-rotatably in a perforation through the base. So that the base 3 and tripod-head 4 can be clamped together the stem may be interiorly threaded to receive a screw 7, extending through said tripod-head and having a winged head at its lower end for its easy operation. By entering the threaded portion of the screw in the stem and running the screw home the head and base can be clamped solidly together. The bottom of the camera case or box 2 has near its forward edge a central opening through which the pivot 5 extends upward, so that means can be provided to operate the connection with the pivot to prevent the turnable camera-box from jumping from place, as will now appear.

Within the camera-case and pivoted at one side of the hole through which the pivot 5 extends is a latch, as 8, having between its ends a substantially semicircular portion to fit, when the latch is in its operative position, within a peripheral groove 9 just below the top of the pivot 5. After the segmental base 3 is clamped to the head of the tripod or equivalent support 4 the pivot 5 will be placed through its hole in the bottom of the camera case or box 2 to bring the latter squarely upon the base 3, the latch 8 at this time being in its backward position. When the camera-box is put upon the base and in proper position, the latch is drawn forward so as to put the semicircular portion thereof into the peripheral groove 9 of the pivot. The latch is of spring metal, and just before it reaches its operative position it rides over a pin 10 on the base of the camera-box opposite the pivot of the latch. The latter when in its operative position will have its free end or portion forward of the pin, so that the latter, acting as a stop, prevents accidental motion of the latch. The latter can be thrust rearward, however, by manipulation, and as it thus moves it will be sprung over the pin, so as to carry it out of the groove in the pivot. The latch in practice, as stated, is made of resilient material to secure the results in question and will be provided at or near its free end with a finger-piece, so as to be readily actuated. The rear wall of the camera-box or camera proper I will designate by 11, said rear wall being laterally extended equally at its opposite sides, as at 12, to provide an elongated surface on its outer side to be traversed by a plate-holder, as 13, for, as will be evident, the plate-holder must move longitudinally as the camera-case 2 is turned. Said rear wall has centrally thereof a slot, as 14, extending for its entire depth or the length of which equals the depth of the camera-box and of the width or depth of the plate. A plate is swept for its entire length across this slot 14, so that the images within the range of the lens can be projected upon the moving plate. The laterally-widened rear wall of the camera is provided with means for supporting and guiding the plate-holder 13. For this purpose it is shown as provided along its upper and lower edges with rearwardly-extending ledges or flanges, as 15, of grooved or substantially right-angular form to receive for sliding motion the plate-holder.

In addition to the slot 14 the rear wall of the camera has a second slot 16 located below and transverse to the slot 14. The horizontal slot 16 is for the passage of means carried in the present case upon the base 3 for longitudinally moving the plate-holder, so as to cause it to sweep, as previously indicated, across the vertical slot 14.

Upon the curved edge of the segmental base 3 is a rib 17, to which is attached in some suitable way a toothed segment, as 18 This toothed segment is concentric with the center of the pivot 5. By providing the rib 17 I can extend the toothed segment through the horizontal slot 16 to bring the teeth thereof into mesh with a rack or racks upon the plate-holder. The plate-holder in the present case is provided with two racks, each designated by 19, and carried on its opposite faces near the upper and lower edges of said plate-holder, so that the plate-holder is reversible or is adapted for carrying two plates. One of the laterally-extended portions or wings 12 of the rear wall 11 of the camera is shown as provided with a stop, as the pin 20, and when the plate-holder strikes this stop it will indicate that the plate has been fully exposed.

It will be assumed that a plate-holder has been placed against the rear wall of the camera-case 2 with the inner end of the said plate-holder adjacent the vertical slot 14 and that the teeth of what is for the time being the inner rack 19 are in mesh with the segment 18. The cap of the lens-tube being off and the diaphragm being open the camera-case will be turned, and as it is turned the teeth of the stationary segment 18 being in mesh with said inner rack 19 the plate-holder (the slide of course having been previously drawn back) will be swept across the vertical slot 14, so as to carry the exposed plate also across said slot and cause the images within the range of the lens to be projected upon the moving plate. Upon the outer faces of the plate-holder I place strips of suitable fabric to shut out the light between the ends of the plate-holder and the slot 14.

Having thus described the invention, what I claim is—

1. In a camera, the combination of a segmental base provided with a rib along its curved portion, a case pivotally mounted upon the base, the rear wall of the case having a vertical slot and a horizontal slot below the vertical slot, the rear wall of said case being widened and having grooved ledges throughout the entire length of its upper and lower edges, a plate-holder adapted to slide along the ledges and having a toothed rack adapted to register with the horizontal slot, a toothed segment fastened to said rib and adapted to extend through said horizontal slot to engage said toothed rack, and a stop upon the rear wall of the camera adapted to be engaged by the plate-holder.

2. A camera having a case, a base, a pivot for the case, upon the base, adapted to permit lateral motion of the case with respect to the base, and a spring-latch in the case adapted to engage the pivot, the latter being grooved to receive the latch.

3. A camera having a case, a base, a pivot for the case upon the base adapted to permit lateral motion of the case with respect to the base, and a spring-latch in the case having a circular portion adapted to partially surround the pivot, the latter having a groove in which the latch fits.

4. A camera having a case, a base, a pivot for the case upon the base adapted to permit lateral motion of the case with respect to the base, a spring-latch in the case adapted to engage the pivot and prevent accidental displacement of the case from the base, and means for holding the latch in its operative position.

5. A camera having a case, a base, a pivot for the case upon the base adapted to permit lateral motion of the case with respect to the base, a spring-latch in the case adapted to engage the pivot and prevent accidental displacement of the case from the base, and a pin in the case adapted to be engaged by the latch when the latter is in its operative position to maintain such relation.

In testimony whereof I have hereunto set my hand in presence of two subscribing witnesses.

JOSEPH GODDARD.

Witnesses:
JOHN J. SKELLY,
GEO. GAGMIER.